Figure 8:
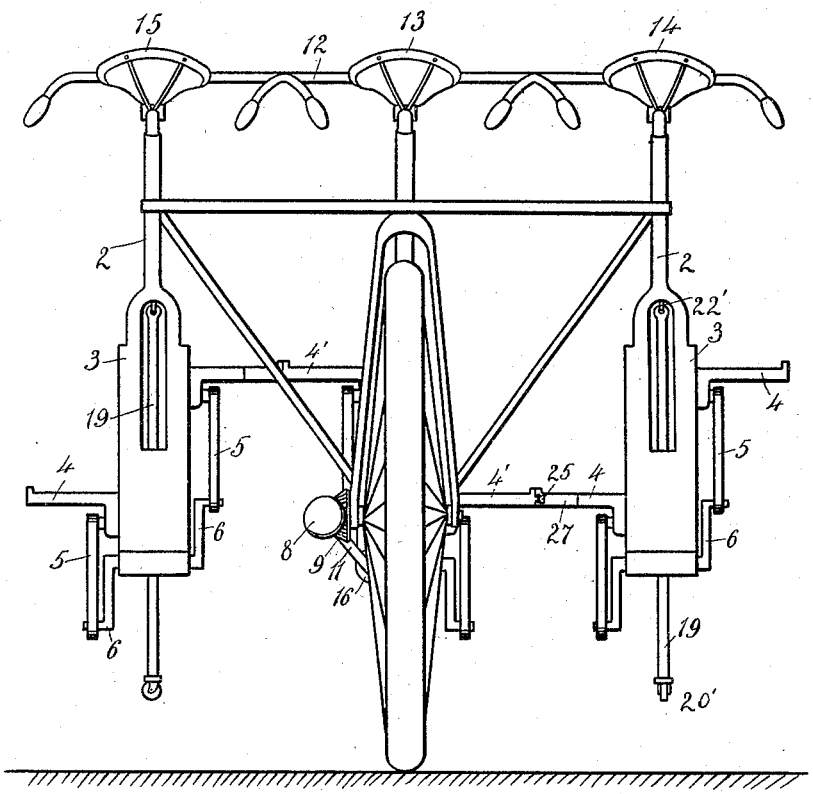

No. 655,830. Patented Aug. 14, 1900.
A. PRAGER.
BICYCLE.
(Application filed Aug. 1, 1899.)
(No Model.) 2 Sheets—Sheet 1.
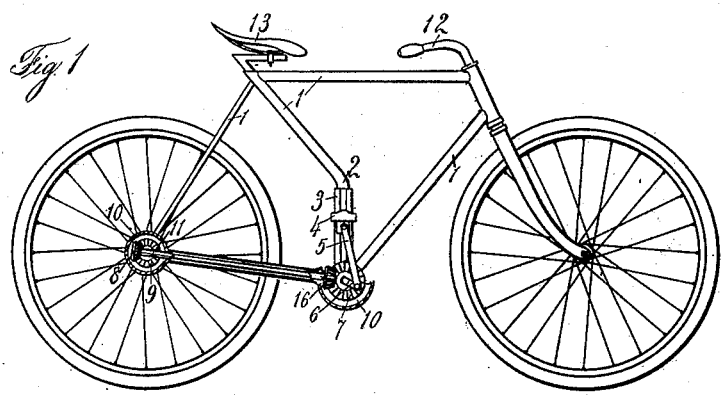
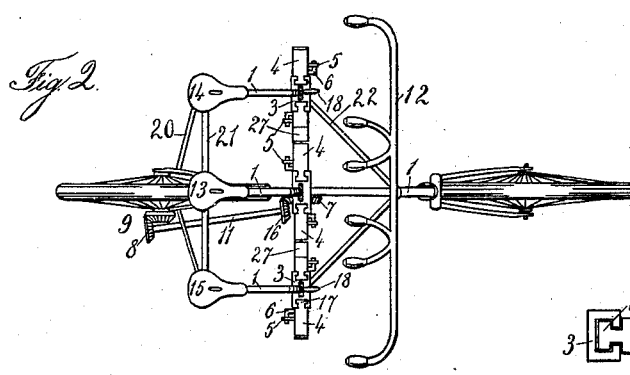
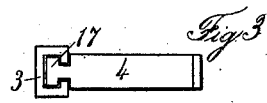
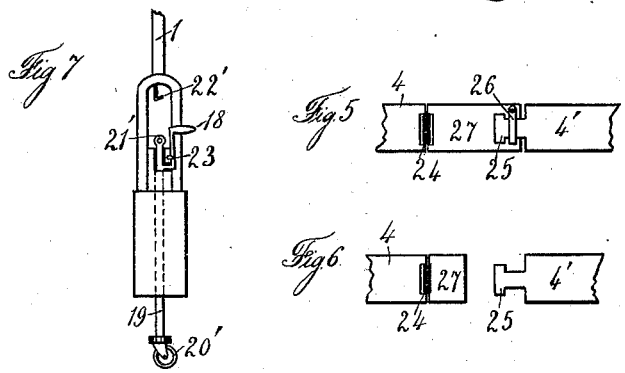
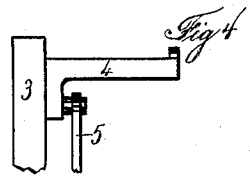
WITNESSES
C. F. Patterson
M. A. Dodsworth
INVENTOR
Anton Prager
Geo. W. Suis.
PER
ATTORNEY No. 655,830. Patented Aug. 14, 1900.
A. PRAGER.
BICYCLE.
(Application filed Aug. 1, 1899.)

(No Model.) 2 Sheets—Sheet 2.

WITNESSES:
C. F. Patterson
M. O. Dodsworth

INVENTOR
Anton Prager
PER
Geo. W. Sues
ATTORNEY

UNITED STATES PATENT OFFICE.

ANTON PRAGER, OF SOUTH OMAHA, NEBRASKA.

BICYCLE.

SPECIFICATION forming part of Letters Patent No. 655,830, dated August 14, 1900.

Application filed August 1, 1899. Serial No. 725,788. (No model.)

*To all whom it may concern:*

Be it known that I, ANTON PRAGER, a subject of the Emperor of Austria-Hungary, residing at South Omaha, in the county of Douglas and State of Nebraska, have invented certain useful Improvements in Bicycles; and I do hereby declare that the following is a full, clear, and exact description of the invention, such as will enable others skilled in the art to which it appertains to make and use the same, reference being had to the accompanying drawings, which form a part of this specification.

This invention has relation to an improvement in bicycles, and embodies a bicycle adapted to carry one, two, or three passengers and so arranged that the machine may be propelled by either one, two, or three operators.

In the accompanying drawings I have shown in Figure 1 a side elevation of a bicycle embodying my invention. Fig. 2 shows a top view disclosing the arrangement of the seats and the handle-bar. Figs. 3 and 4 are respectively a top and side view of details of the pedals. Figs. 5 and 6 show enlarged detached broken details disclosing the clamp by means of which the pedals are connected. Fig. 7 discloses an enlarged detail of the device used in connection with my invention to hold the machine in an upright position when not in use, while Fig. 8 shows a vertical section of Fig. 1.

My invention embodies, essentially, a bicycle provided with one propelling mechanism which is actuated, however, by three pairs of pedals, which pedals can be united or disconnected at will, and, further, has three seats and three handle-bars, so that three operators may simultaneously ride the machine, so that either one, two, or three may propel the vehicle.

My invention embodies a suitable supporting-frame comprising the bars 1 1 of any suitable construction, to which, however, are secured the transverse bars 20, 21, and 22 and from which depend upright posts 2, to which posts 2 are secured the grooved holders 3, within which grooved holders 3 vertically slide the pedals 4, each post 2 being provided with two of said grooved holders 3. Between these grooved holders are the upper horizontal bars 1, to which are secured the three seats, being marked 13, 14, and 15. Secured below to the frames are three stub-shafts, and to each stub-shaft are secured cranks 6, and to these cranks 6 are secured the pitman-rods 5, and these rods in turn are secured to the pedals 4, so that as these pedals 4 are working up and down the stub-shafts are revolving. In Fig. 1 the end seat is removed, so as to clearly show a portion of the central stub-shaft, which is further provided with the bevel-gear 7, in turn meshing with the bevel-gear 16, secured to shafts 11, and its end is provided with a second bevel-gear 8, working with a further bevel-gear 9, secured to the axle of the rear supporting-wheel, so that primarily the central stub-shaft is the only one provided with driving bevel-gears. The other two riders when they are to aid in propelling the machine have their inner pedals connected with the pedals of the central stub-shaft, as in Fig. 5. I have shown the pedals 4 4', the one marked 4' (the center driving-pedal) being secured to the pedal 4 by means of a hinge 24, and this pedal 4' is provided with a projection 25, adapted to be engaged by the keeper 26, secured to the hinged portion 27, so that the outer pedals may be securely united to the inner pedals, so that two riders might sit upon the seats 14 and 15, as is shown in Fig. 2, leaving the central seat 13 vacant, and drive the machine simply by virtue of the inner pedals being secured to the pedals of the central driving system. The handle-bar 12 is provided with six handles, so that each operator has a pair of handles where three operators are to control the machine.

Referring to Fig. 8, it will be noticed that in order to connect the outer pedals 6 6 to the inner pedals it will simply be necessary to unite the bars 4 4' by means of the latching mechanism described, when the inner pedals of each of the outer set will be secured to the central pedals.

Now should it be desired the frame at a suitable point can be provided with a housing 3, referring now to Fig. 7, from which extends the framework 1, and this housing 3 is provided with a bar 19, provided with a roller 20' below and operating-handles 18 and an eye 21'. Whenever this handle 18 is depressed, the wheel and bar 19 support the machine in an upright position. However, when the machine is used on the road the handle is drawn upward out of the holder 23 and hooked upon the hook 22', when it is out of the way. It will be noticed that I have secured this holder to one of the curved holders 3 opposite the seats 14 and 15, as is shown in Fig. 2, so that when these bars are depressed it is impossible for the bicycle to fall either to the right or to the left, as two of these steadying devices are provided.

The steering-head, front wheel, and handle-bars in my invention are as usually constructed, with the exception that the handle-bar is provided with three handles.

Any suitable driving-gear mechanism may be employed which is to rotate the rear axle.

In Fig. 1 I have shown in dotted lines the frame and arrangement when used in arranging a so-called "lady's wheel."

Having thus described my said invention, what I claim as new, and desire to secure by United States Letters Patent, is—

In a bicycle of the character described, the combination of the following instrumentalities, to wit: a supporting-frame comprising the bars 1 and 2, the transverse bars 20, 21 and 22; the grooved holders 3 secured to said bars 2, the vertically-sliding pedals 4 within said holders 3, each of said posts 2 being provided with two of said grooved holders 3, the three seats 13, 14, and 15 secured to said horizontal frame-bar, three stub-shafts secured below to said frames, each being provided with the cranks 6, 6, the pitman-rods 5 extending from said cranks 6, said rods in turn being secured to said pedals 4, said pedals working vertically, the bevel-gear 7 secured to the central stub-shaft, the meshing gear 16 secured to the shaft 11, the second bevel-gear 8 meshing with the bevel-gear 9, secured to the rear axle, and the handle-bar 12 secured to the front of the wheel and common to all three sets of pedals, all arranged substantially as and for the purpose set forth.

ANTON PRAGER.

Witnesses:
GEORGE W. SUES,
MABEL A. DODSWORTH.